United States Patent [19]

Gifford

[11] 4,208,020
[45] Jun. 17, 1980

[54] SELF-CENTERING BAIL FOR FISHING REEL

[75] Inventor: Richard L. Gifford, Tulsa, Okla.

[73] Assignee: Brunswick Corporation, Skokie, Ill.

[21] Appl. No.: 932,847

[22] Filed: Aug. 11, 1978

[51] Int. Cl.² ............................................. A01K 89/01
[52] U.S. Cl. ............................................. 242/84.2 G
[58] Field of Search ............... 242/84.21 R, 84.21 A, 242/84.2 G, 84.2 R, 84.51 A, 84.51 R, 84.5 A, 84.5 R

[56] References Cited

U.S. PATENT DOCUMENTS

| | | | |
|---|---|---|---|
| 2,773,655 | 12/1956 | Mandolf | 242/84.21 R |
| 3,138,344 | 6/1964 | Small | 242/84.21 R |
| 3,144,217 | 8/1964 | Wood, Jr. | 242/84.5 A |
| 3,946,963 | 3/1976 | Oberg | 242/84.21 R |
| 4,087,058 | 5/1978 | Yamasaki et al. | 242/84.51 A |

*Primary Examiner*—Billy S. Taylor
*Attorney, Agent, or Firm*—John G. Heimovics

[57] ABSTRACT

This invention comprehends a spinning style fishing reel wherein an anti-reverse and a self-centering bail mechanism are jointly incorporated in the housing of the reel. This mechanism provides that the bail of the fishing reel may be located in the same optimum position for casting time after time.

15 Claims, 11 Drawing Figures

SELF-CENTERING BAIL FOR FISHING REEL

BACKGROUND OF THE INVENTION

1. Field of the Invention

This invention relates to spinning type fishing reels, and more particularly, relates to a self-centering and anti-reverse mechanism both incorporated into the housing of the reel that permits no more than one counter clockwise rotation of the winding cup.

2. Background of the Prior Art

It is known in the prior art, in limited areas, that it is possible to incorporate an anti-reverse and self-centering bail mechanism into a spinning style fishing reel. This particular mechanism was first employed by the Langley Manufacturing Company about twenty years ago and is taught in U.S. Pat. No. 2,773,655. This particular mechanism was incorporated inside the rotor and external to the gear housing of the fishing reel. The Langley device had limited use and constantly caused a problem for fishermen in that in order to use the device a fisherman would have to get his hands in the way of the fishing line. It became obvious that this desirable self-centering and anti-reverse feature that could be incorporated in the back of a reel would be quite advantageous. Many spinning reels were made thereafter incorporating the anti-reverse mechanism that was operated at the rear of the fishing reel but no such incorporation was made of the self-centering bail feature. This failure of the prior art to teach the incorporation of both an anti-reverse and self-centering bail mechanism has up to now remained unsatisfied.

SUMMARY OF THE INVENTION

This invention relates to a spinning style fishing reel that incorporates an anti-reverse and self-centering bail mechanism that is located within the gear housing of the reel and not within the rotor. By locating the mechanism in the gear housing the means for bringing the self-centering and anti-reverse feature into operation can be located at the back of the reel out of the way of the fishing line.

It is therefore an object of this invention to provide a self-centering bail mechanism and an anti-reverse mechanism in a spinning fishing reel that is located within the housing of the reel.

It is another object of this invention to provide such a dual mechanism that can be operated from the back portion of the fishing reel away from the fishing line.

Yet another object of this invention is to provide a simple self-centering bail mechanism whereby the bail can be placed in the same position for casting each time.

The above and other and further objects and features will be more readily understood by reference to the following detailed description and the accompanying drawings.

DESCRIPTION OF THE PREFERRED EMBODIMENTS

Figure 1:
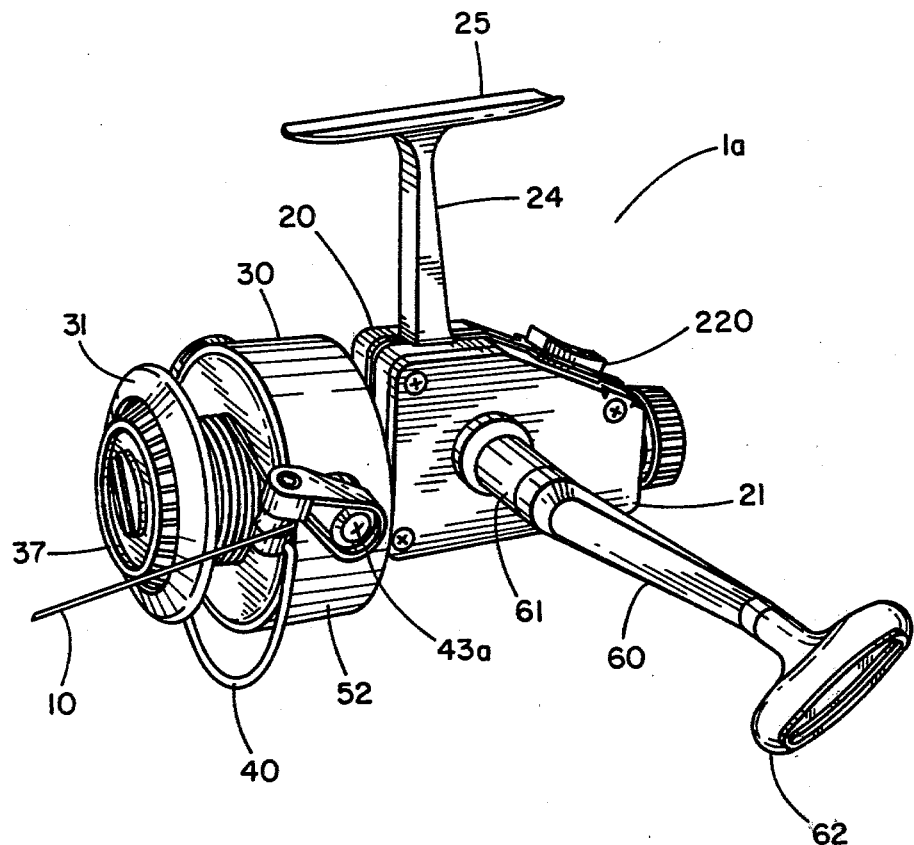
FIG. 1 is a perspective view of the conventional style spinning reel containing the invention described herein.
Figure 2:
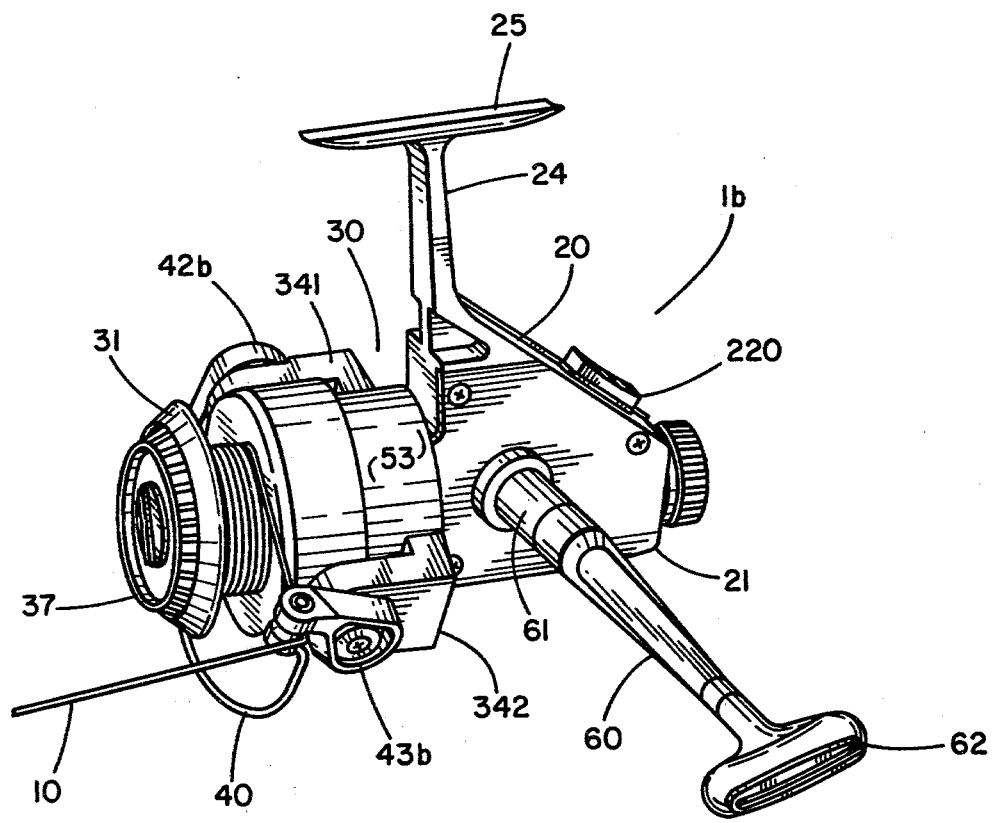
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used. The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 60 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1, 2, 5 and 6, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 (shown in phantom in FIGS. 5 and 6) of oscillator slider 75. Rotation of the gear 73 causes the slider 75 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15, the shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob 37 that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Contrary to standard spinning reels that have their drag associated with the front spool or locked into the back portion of the housing, the drag mechanism 50 is free-floating (it is self-contained as a unit and not captured in the housing).

A unique feature of reels 1a and 1b is the combined anti-reverse and self-centering bail feature that optionally can be used. In all spinning reels there is one best position in which to open the bail for casting, this is normally when the bail arms 42a, 42b, 43a and 43b are in generally vertical alignment with stem 24. Concomitantly, all reels need a device that prevents the rotor from rotating backward or in the counterclockwise direction when the reel is viewed from the face or the spool 31. In the conventional reel 1a shown in FIGS. 1, 3 and 5, the self-centering mechanism 200 is depicted and in the skirted reel 1b as shown in FIGS. 2, 4 and 6, the self-centering mechanism 300 is depicted; the reel 1a in FIGS. 1, 3 and 5 can be easily adapted to incorporate the mechanism 300.

Not only is the anti-reverse and self-centering of the bail necessary, an automatic mechanism that causes the bail to move from the casting position to the retrieve position by just a turn of the handle 62 is also required. In the conventional reel 1a, shown in FIG. 3, the automatic internal bail trip mechanism 240 is shown in an exploded view. Most of the mechanism is contained in the rotor cup 52 and cooperates with cam 29 on the face 22 of the housing 20. In the skirted reel 1b, shown in FIG. 4, the major portion of the unique (unique because most skirted reels have external bail trip mechanisms) internal bail trip mechanism 340 is contained in ear 341 on the rotor 53 and cooperates with the cam surface 29 on the front of the housing 20.

Figure 3:
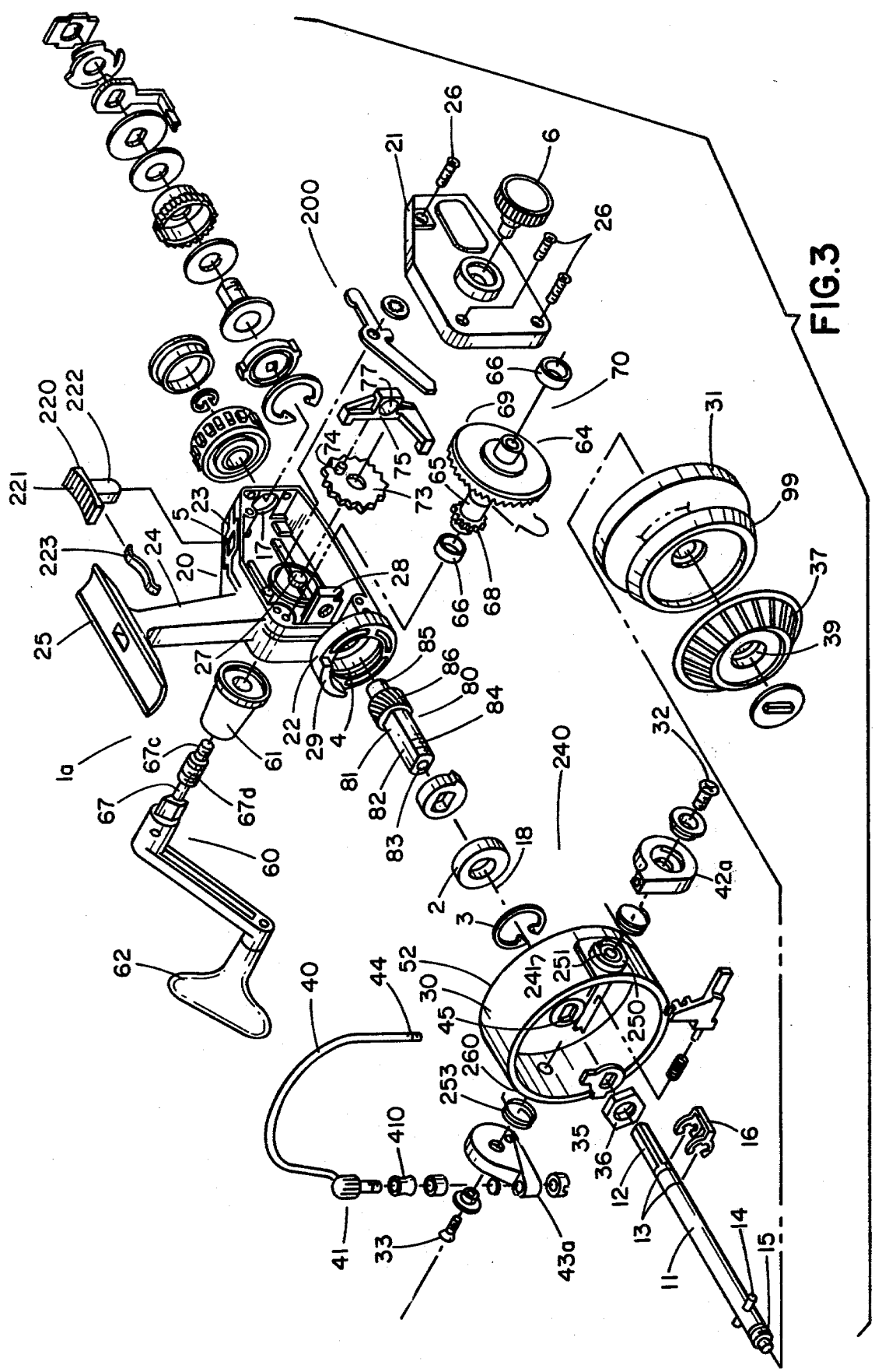
FIG. 3 is an exploded perspective view of the conventional style spinning reel capable of containing the invention described herein by substitution of the mechanism shown in FIG. 4 (hereinafter described) for the self-centering mechanism as shown in FIG. 3 and designated 200.
Figure 4:
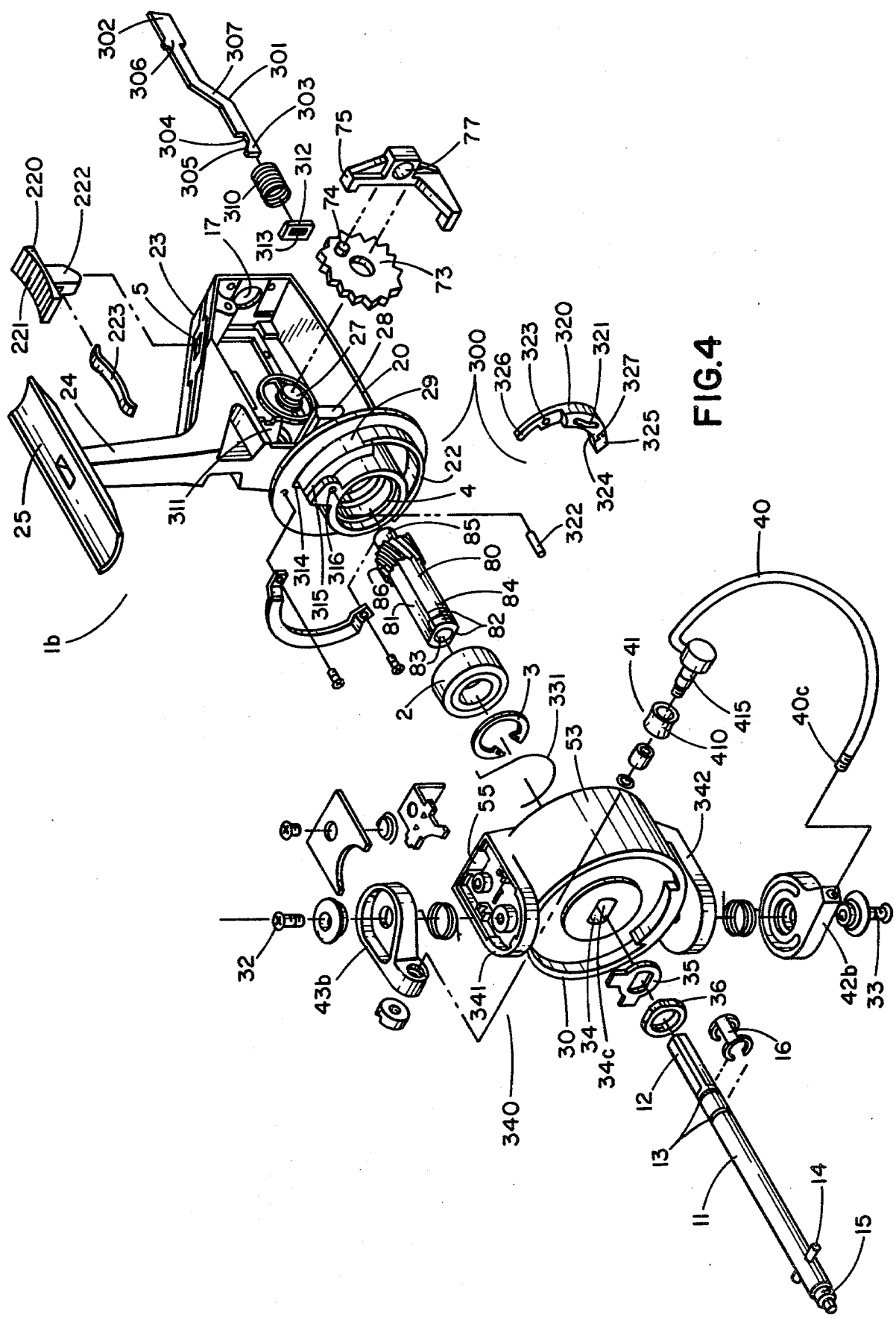
FIG. 4 is an exploded perspective view of the skirted style spinning reel not depicting some of the parts in common with the conventional reel shown in FIG. 3 but capable of incorporating the invention described herein.
Figure 5:
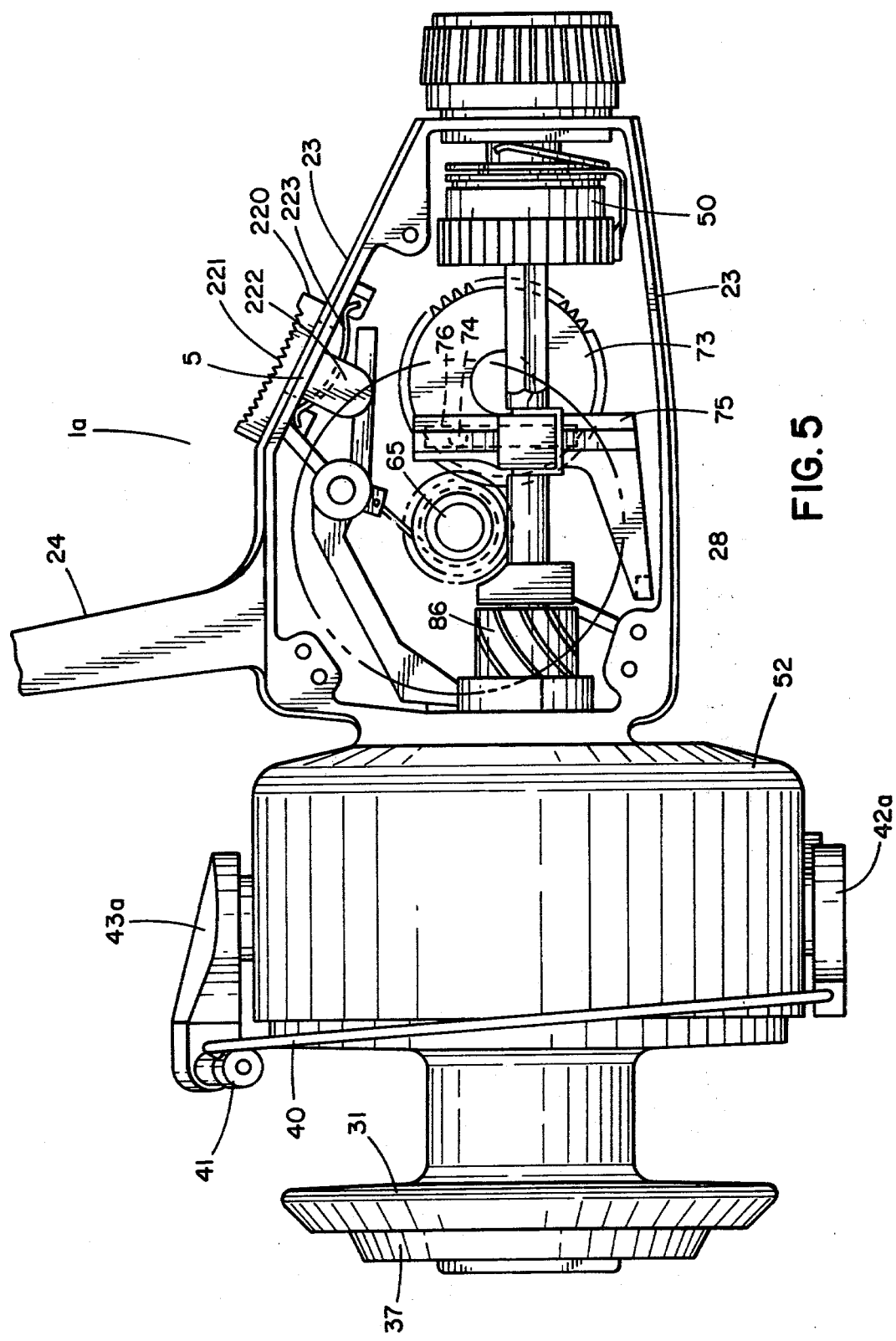
FIG. 5 is a cutaway side view of the conventional style spinning reel depicting the relative location of some of the parts of the reel.
Figure 6:
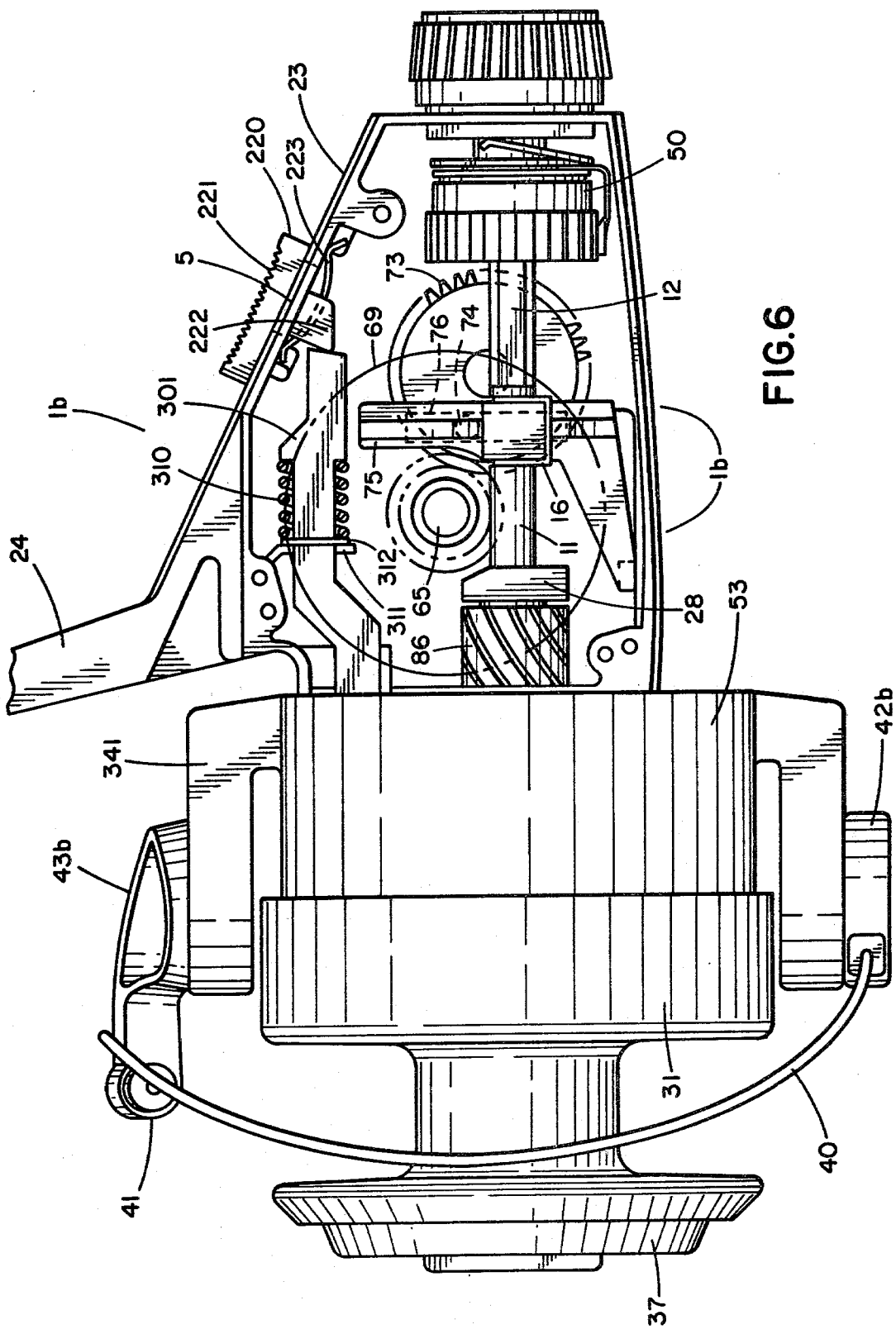
FIG. 6 is a cutaway side view of the skirted style spinning reel depicting the relative location of some of the parts of the reel.
Figure 7:
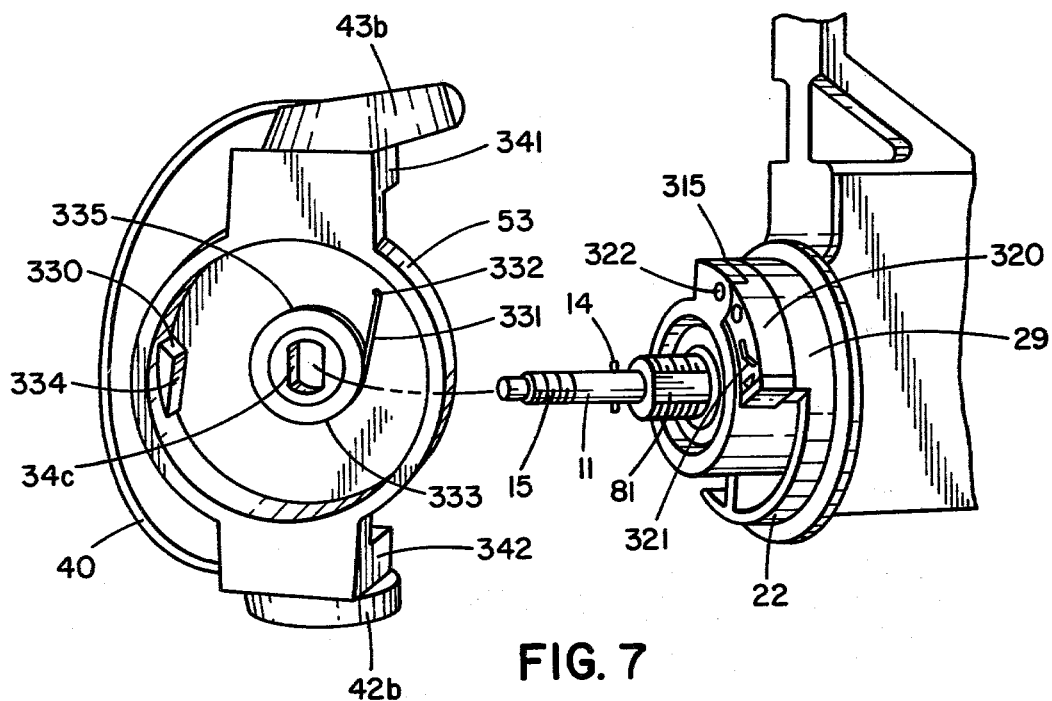
FIG. 7 is a perspective style view whereby the internal surface of the rotor is exploded from the external front housing depicting an embodiment of the invention.
Figure 9:
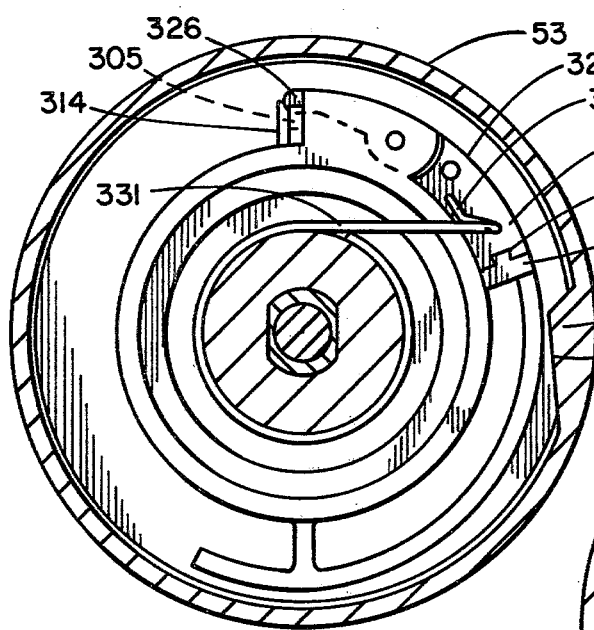
FIG. 9 is a cross sectional view of an embodiment of the invention taken of FIG. 8.
Figure 11:
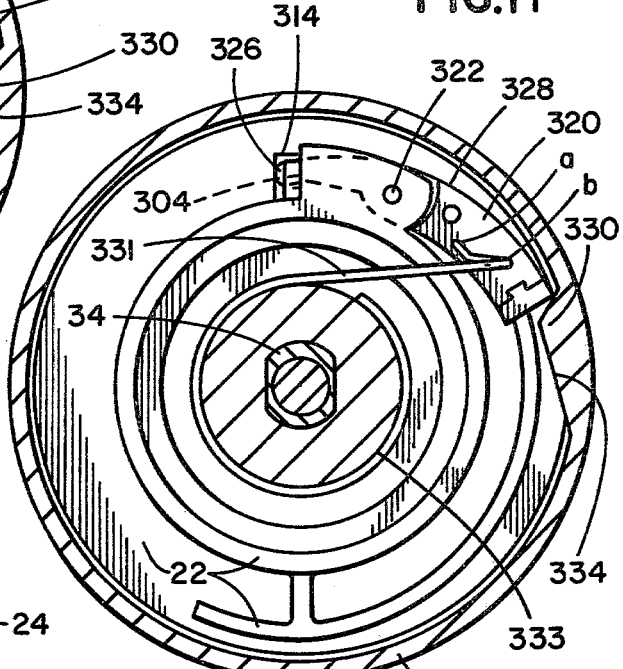
FIG. 11 is a cross sectional view taken of a portion of FIG. 10.
Figure 10:
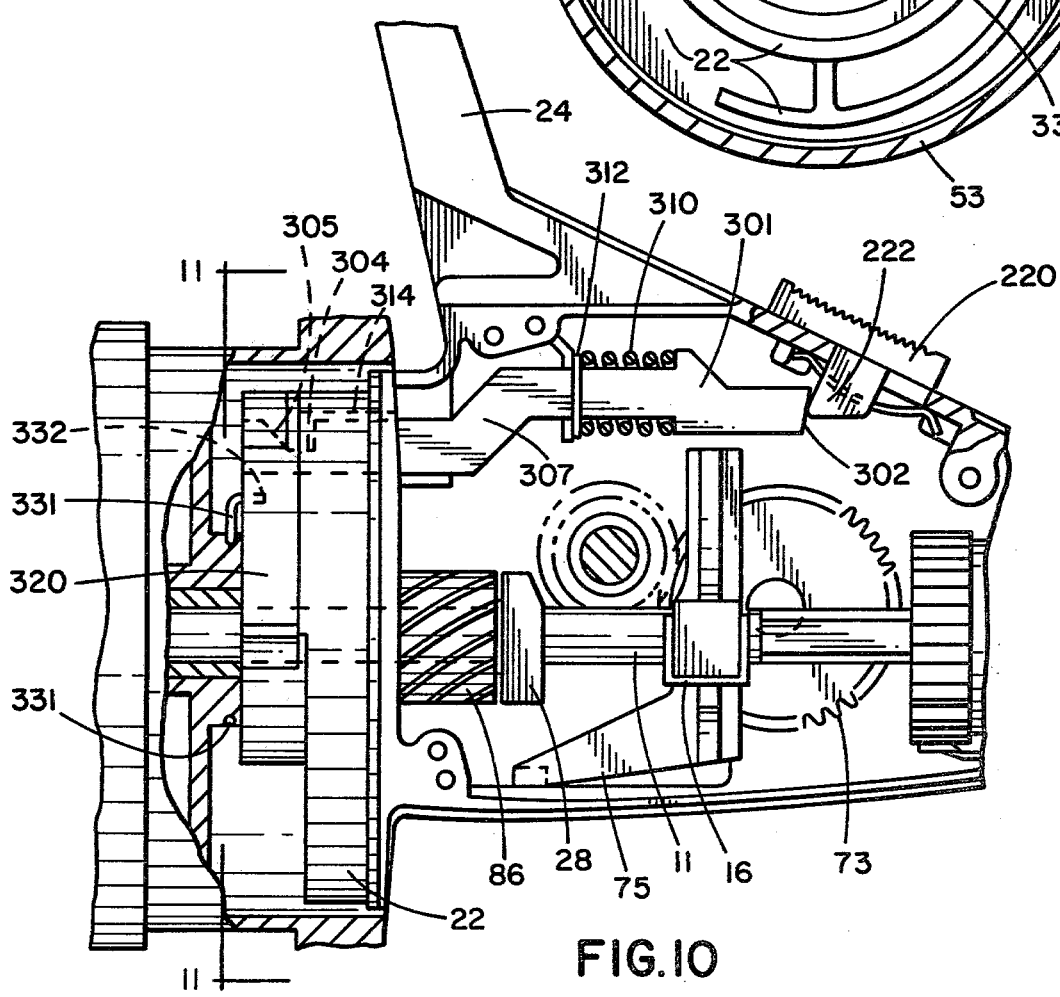
FIG. 10 is a partial cross sectional view of an embodiment of the invention.

In the embodiment of the reel 1b, as shown in FIGS. 2, 4, and 6 and which can be substituted for the self-centering mechanism 200 of reel 1a in FIGS. 1, 3 and 5, an anti-reverse and self-centering bail mechanism 300 utilizes a pivoting pawl 320 mounted on the face 22 of the housing 20 in slot 315 by pressing pin 322 into housing hole 316 and slip fit with pawl hole 323. The pawl 320 has a closed position as shown in FIG. 9 and an open position as shown in FIG. 11. An arm 301 is positioned in case 23 and mounted on support 311 forced in a backward direction by spring 310 which surrounds the arm 301 in back of the offset 307. Keeper 312 slides by means of hole 313 over the arm 301 and interacts with keeper 306 to maintain the spring 310 under compression. The front end 303 of arm 301 slides through hole 314 and housing face 22. The notch 304 and the bevel 305 cooperate and are adjacent the near end 326 of the pawl 320. A slide button 220 has a ribbed finger portion 221 exterior of the case 23 and an elongated portion 222 that projects through the slot 5 into the interior of the case 23. The button 220 slides back and forth and is retained in either position by spring 223. In the forward position the portion 222 forces the arm 301 forward as shown in FIG. 10. In this position the near end 326 is opposite the bottom or smallest part of the arm 301 at the notch 304 permitting the pawl 320 to pivot to the open position. This pivoting and maintaining the pawl 320 in the open position is accomplished by means of wire spring 331 that clips over groove 333 in the rotor hub 335. The bent end 332 of the spring 331 fits into and slides in groove 321 to the "a" position of the groove 321 forcing the pawl 320 to pivot out and maintaining the pawl 320 in the open position. A resilient foot 325 is force fit into the dovetail groove 327 in the extended end 324. When the rotor 53 is rotated in a counterclockwise direction (when viewed from the front or spool of the reel) and the pawl 320 is in the open position, the foot 325 contacts the tooth 330, mounted on the interior surface of the rotor 53, and stops the rotation of the rotor 53. In this position, the bail arms 42b and 43b are substantially vertically aligned with the stem 24 and the bail 40 is now located in the optimum position in which it may be opened in order for casting the line. Thus, one of the purposes of the self-centering bail mechanism 300 is accomplished.

When the rotor 53 is rotated in a clockwise direction, such as during retrieving the line 10, the cam surface 334 of the tooth 330 contacts the curved surface 328 of the pawl 320 forcing the pawl 320 to the close position. This permits easy rewinding or retrieving of the line 10 but also provides that in the event that a sudden pull is placed on the line 10, such as by a large fish, that the rotor 53 can make, at best, only one counterclockwise rotation before it is stopped by contact of the foot 325 and the tooth 330. This anti-reverse arrangement operates independently of the drag.

Figure 8:
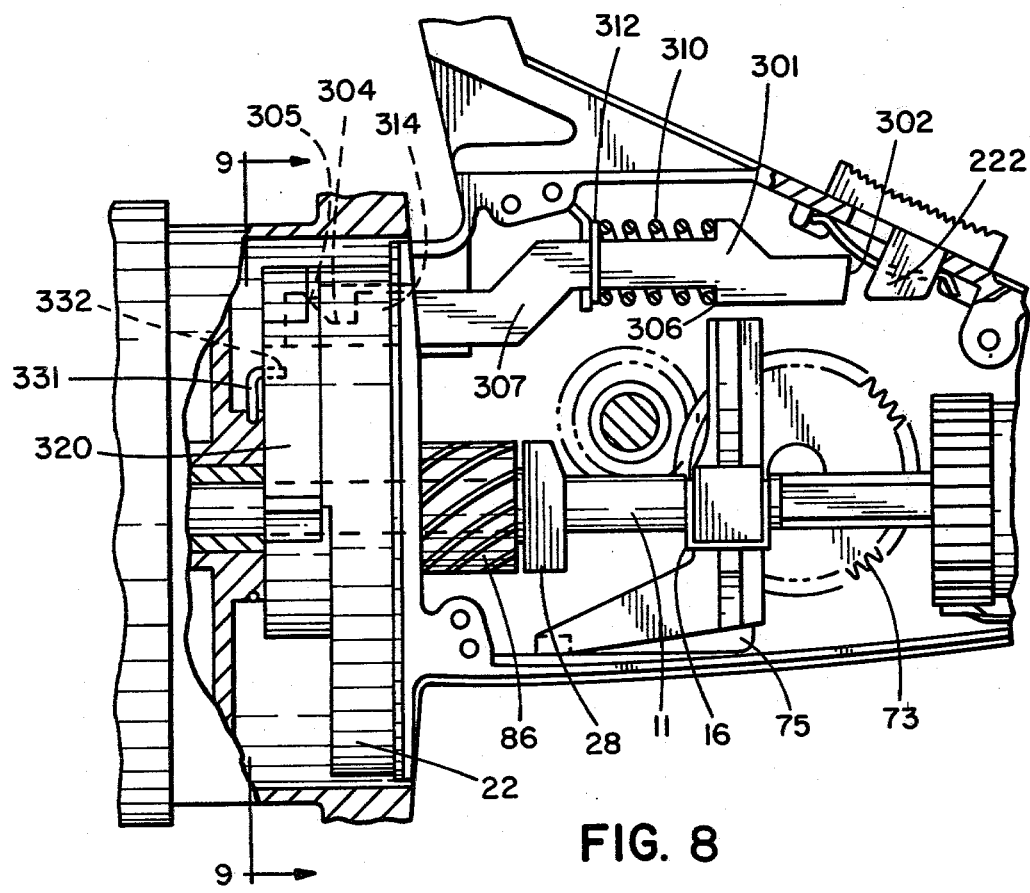
FIG. 8 is a partial cross sectional view of an embodiment of the invention.

The pawl 320 can be maintained in the close position by sliding the button 220 to the backward position whereby lower portion 222 no longer contacts the end 320 and spring 310 forces the arm 301 into its backward most position. When the arm 301 is back, the bevel 305 is in contact with the near end 326 forcing it to the upper most position, as shown in FIGS. 8 and 9, and maintaining the pawl 320 in the closed position. This permits the rotor 30 to freely rotate in either the clockwise or counterclockwise direction. The interaction of the arm 301, the pawl 320 and the tooth 330 on the internal circular wall surface of the rotor 53 permits both the self-centering and anti-reverse mechanism of this invention to operate.

Although specific embodiments of the invention have been described, many modifications and changes may be made in the fishing reel without departing from the spirit and scope of the invention as defined in the appended claims.

What is claimed is:

1. In an open face spinning reel used for casting a bait attached to a fishing line and for retrieving the bait and fishing line after casting, the reel having a housing having a forward face portion and a rearward back portion, a center shaft mounted in the housing, a spool mounted on the shaft for holding the fishing line, a pinion gear assembly rotatably journaled near the center and the forward portion of the housing, the assembly coaxial with the center shaft and having a threaded portion at one end, a handle and gear train assembly mounted on the housing and operable with the pinion assembly, a cup shaped rotor mounted on the threaded portion of the pinion assembly and rotatable in both the clockwise and counterclockwise directions by cooperative movement of the handle and gear train and pinion assembly, and a movable bail mounted on the rotor having an open casting position and a closed retrieving position, preselectedly stopped counterclockwise rotation of the rotor provides a self-centering rotor position for repeatedly opening the bail to the same casting position, an improved self-centering bail mechanism comprising:
   (a) an arm slidably mounted in the housing and having a forward end and a rearward end, the forward end adjacent the forward face portion of the housing;
   (b) first means for moving the rearward end from a back position to a forward position,
   (c) second means for biasing the rearward end of the arm in the back position,
   (d) a pawl pivotally mounted on the forward face of the housing, the pawl having an open position and a closed position,
   (e) the cup shaped rotor having a recessed portion and an inwardly projecting tooth on the recessed portion, the recessed portion covering the forward face portion of the housing;
   (f) third means for moving the pawl to the open position stopping the counterclockwise rotation of the rotor when the pawl contacts the tooth placing the rotor in the self-centering position whereby the bail may be opened.

2. The reel of claim 1 wherein the pawl in the open position does not preclude clockwise rotation of the rotor.

3. The reel of claim 1 further including fourth means for moving the pawl to the closed position overriding the third means permitting the rotor to rotate in both a clockwise and counterclockwise direction.

4. The reel of claim 1 wherein the pawl has an extended end and a near end close to the pivot mounting.

5. The reel of claim 4 wherein the extended end has a resilient foot that contacts the tooth.

6. The reel of claim 1 wherein the pawl has a forward face in the same direction as the forward face of the housing.

7. The reel of claim 6 wherein the forward face of the pawl has a groove.

8. The reel of claim 7 wherein the third means includes a spring secured in the interior of the rotor and having a bent end that fits into the groove in the pawl.

9. The reel of claim 1 wherein the first means includes a button having a portion inside the housing and a portion outside the housing.

10. The reel of claim 9 wherein the portion of the button inside the housing contacts the rearward end of the arm.

11. The reel of claim 1 wherein the second means includes a spring and a keeper mounted on the arm.

12. The reel of claim 3 wherein the fourth means includes the forward end of the arm passing through the housing and extending forward therefrom.

13. The reel of claim 4 or claim 12 wherein the near end of the pawl has a finger.

14. The reel of claim 13 wherein the forward end of the arm has a bevel that cooperates with the finger to retain the pawl in the closed position when the rearward end of the arm is in the back position.

15. In an open face spinning reel used for casting a bait attached to a fishing line and for retrieving the bait and fishing line after casting, the reel having a housing that has a forward face portion and a rearward back portion, a center shaft mounted in the housing, a spool mounted on the shaft for holding the fishing line, a pinion gear assembly rotatably journaled in the housing, the assembly coaxial with the center shaft, a handle and gear train assembly mounted on the housing and operable with the pinion assembly, a cup shaped rotor mounted on the pinion assembly and rotatable in both the clockwise and counterclockwise directions by cooperative movement of the handle and gear train and pinion assembly, and a bail movably mounted on the rotor having an open casting position and a closed retrieving position, preselected stopped counterclockwise rotation of the rotor provides a self-centering rotor position for opening the bail to the same casting position, an improved self-centering bail mechanism comprising:

(a) an arm slidably mounted in the housing and having a forward end and a rearward end, the forward end adjacent the forward face portion of the housing and the rearward end extending toward the rearward back portion of the housing;

(b) first means for moving the rearward end from a back position to a forward position, (c) second means for biasing the arm from the forward position to the back position, (d) a pawl pivotally mounted on the forward face of the housing, the pawl having an open position when the rearward end of the arm is in the back position and a closed position when the rearward end of the arm is in a forward position, (e) the rotor cup having a recessed portion covering the forward face portion of the housing and the recessed portion having an inwardly projecting tooth, (f) third means for moving the pawl to the open position stopping the counterclockwise rotation of the rotor when the pawl contacts the tooth placing the bail of the rotor in the self-centering position.

* * * * *